(12) United States Patent
Wang (10) Patent No.: US 12,552,605 B2
(45) Date of Patent: Feb. 17, 2026

(54) LOGISTICS VEHICLE AND LOGISTICS SYSTEM

(71) Applicant: BEIJING JINGDONG QIANSHI TECHNOLOGY CO., LTD., Beijing (CN)

(72) Inventor: Xianwang Wang, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 846 days.

(21) Appl. No.: 17/781,032

(22) PCT Filed: Dec. 18, 2020

(86) PCT No.: PCT/CN2020/137788
§ 371 (c)(1),
(2) Date: May 30, 2022

(87) PCT Pub. No.: WO2021/143460
PCT Pub. Date: Jul. 22, 2021

(65) Prior Publication Data
US 2023/0002157 A1      Jan. 5, 2023

(30) Foreign Application Priority Data

Jan. 19, 2020   (CN) .......................... 202010058602.8

(51) Int. Cl.
*B65G 1/04*      (2006.01)
*B60L 5/38*      (2006.01)

(52) U.S. Cl.
CPC .............. *B65G 1/0492* (2013.01); *B60L 5/38* (2013.01)

(58) Field of Classification Search
CPC .................................. B65G 1/0492; B60L 5/38
See application file for complete search history.

(56) References Cited

U.S. PATENT DOCUMENTS 6,963,796 B2* 11/2005 Larson ................... G06F 1/3203
701/69
11,993,457 B2* 5/2024 Turner ..................... B60L 1/003
(Continued)

FOREIGN PATENT DOCUMENTS

CN          204250735 U      4/2015
CN          105584766 A      5/2016
(Continued)

OTHER PUBLICATIONS

"Communication with Supplementary European Search Report", EP Application No. 20913388.3, Oct. 25, 2023, 7 pp.
(Continued)

*Primary Examiner* — Jason C Smith
(74) *Attorney, Agent, or Firm* — Myers Bigel, P.A.

(57) ABSTRACT

A logistics vehicle and a logistics system. The logistics vehicle includes: a frame; a climbing assembly including a climbing wheel movably provided on the frame, the climbing wheel being configured to be extendable with respect to the frame, to cooperate with a first rail assembly arranged vertically, so that the logistics vehicle moves along the first rail assembly, and the climbing wheel being configured to be retractable with respect to the frame; and a power take-up assembly movably provided on the frame and configured to be extendable with respect to the frame to take up power when the climbing wheel extends with respect to the frame and cooperates with the first rail assembly; and the power take-up assembly being further configured to retract when the climbing wheel retracts with respect to the frame. The logistics vehicle draws power during climbing, which is conducive to achieving climbing operation.

13 Claims, 6 Drawing Sheets

(56) References Cited

U.S. PATENT DOCUMENTS

| | | | | |
|---|---|---|---|---|
| 2012/0187753 | A1* | 7/2012 | Schaffnit | H01M 16/006 903/903 |
| 2019/0245366 | A1* | 8/2019 | Coady | B65G 1/1373 |
| 2019/0270591 | A1* | 9/2019 | Lert, Jr. | B65G 1/0435 |
| 2023/0002157 | A1* | 1/2023 | Wang | B60L 5/38 |
| 2024/0409309 | A1* | 12/2024 | Koga | B65F 3/14 |

FOREIGN PATENT DOCUMENTS

| | | | | |
|---|---|---|---|---|
| CN | 105967105 | A | | 9/2016 |
| CN | 108290685 | A | | 7/2018 |
| CN | 109476419 | A * | 3/2019 | ........... B65G 1/0478 |
| CN | 208760435 | U * | 4/2019 | ............... B60L 5/00 |
| CN | 110304387 | A | | 10/2019 |
| CN | 110329707 | A * | 10/2019 | ............... B65G 1/04 |
| CN | 111791708 | A | | 10/2020 |
| CN | 211809085 | U | | 10/2020 |
| CN | 114132678 | A * | 3/2022 | ........... B65G 1/0478 |
| JP | H04185234 | A | | 7/1992 |
| JP | H04256609 | A | | 9/1992 |
| JP | 5929813 | B2 * | 6/2016 | |
| JP | 2018516824 | A | | 6/2018 |
| WO | 2016196815 | A1 | | 12/2016 |
| WO | 2016199033 | A1 | | 12/2016 |
| WO | 2017197121 | A1 | | 11/2017 |

OTHER PUBLICATIONS

"First Office Action" with English-language translation, CN Application No. 202010058602.8, Sep. 3, 2024, 18 pp.

"Notice of Reasons for Refusal" and English-language translation, JP Application No. 2022-535897, Nov. 22, 2024, 14 pp.

"International Search Report and Written Opinion of the International Searching Authority with English language translation", International Application No. PCT/CN2020/137788, Mar. 22, 2021, 19 pp.

* cited by examiner

LOGISTICS VEHICLE AND LOGISTICS SYSTEM

CROSS-REFERENCE TO RELATED APPLICATIONS

This disclosure is a U.S. National Stage Application under 35 U.S.C. § 371 of International Patent Application No. PCT/CN2020/137788, filed on Dec. 18, 2020, which is based on and claims priority to CN application No. 202010058602.8, filed on Jan. 19, 2020, the disclosures of both of which are hereby incorporated by reference in their entireties.

TECHNICAL FIELD

The present disclosure relates to the field of warehousing and logistics equipment, in particular to a logistics vehicle and a logistics system.

BACKGROUND

Slide wire power supply is often used for moving equipment, such as shuttle vehicles, cross-belt sorting lines, stacker and other logistics equipment, and has the advantages of a high current, stability and reliability, and a large stroke. A specific application form is as follows: a slide wire is installed on a fixed component such as a goods shelf, a machine body or a rail assembly, and a current collector is installed on a vehicle body or a moving component. A movement trajectory of the vehicle body or the moving component is consistent with the arrangement shape of the slide wire, and a brush of the current collector is in contact with a conductor of the slide wire all the time to ensure continuous power supply.

For some of the equipment, as part of the movement route trajectory is complex and does not need power supply, the slide wire is cut off and the brush of the current collector is disengaged from the conductor of the slide wire in the part of the movement route trajectory, and after entering a simple route, the slide wire is installed and the current collector is connected to ensure power supply.

The current collector and the slide wire being in contact all the time or disengaged partially is suitable for a situation where the vehicle body or equipment performs linear reciprocating motion or circular periodic motion in the same horizontal plane, and this structure cannot be adapted to a situation when the vehicle body or equipment needs to leave an original motion plane, or switch a rail assembly for movement.

SUMMARY

According to an aspect of some embodiments of the present disclosure, a logistics vehicle is provided, including:
  a frame;
  a climbing assembly including a climbing wheel movably provided on the frame, the climbing wheel being configured to be extendable with respect to the frame, to cooperate with a first rail assembly arranged vertically, so that the logistics vehicle moves along the first rail assembly, and the climbing wheel being configured to be retractable with respect to the frame; and
  a power take-up assembly movably provided on the frame, the power take-up assembly being configured to be extendable with respect to the frame to take up power when the climbing wheel extends with respect to the frame and cooperates with the first rail assembly; and the power take-up assembly being further configured to retract when the climbing wheel retracts with respect to the frame.

In some embodiments, the climbing assembly further includes a first axle, the first axle being movably provided on the frame, and the climbing wheel being provided on the first axle.

In some embodiments, the climbing assembly further includes a first guide sleeve, the first guide sleeve being fixedly provided on the frame, and the first axle being movably passed through the first guide sleeve.

In some embodiments, the climbing assembly further includes a support wheel, the support wheel being provided on the first axle, the support wheel being closer to the outer side of the frame with respect to the climbing wheel, the diameter of the support wheel being smaller than that of the climbing wheel.

In some embodiments, the climbing assembly further includes a second axle and a guide wheel, the second axle being movably provided on the frame, and the guide wheel being provided on the second axle.

In some embodiments, the climbing assembly further includes a second guide sleeve, the second guide sleeve being fixedly provided on the frame, and the second axle being movably passed through the second guide sleeve.

In some embodiments, the climbing assembly further includes a connecting plate, the connecting plate connecting the first axle and the second axle; and the logistics vehicle includes a power unit, which is in driving connection with the connecting plate to drive the connecting plate to move relative to the frame.

In some embodiments, the power take-up assembly is provided on the connecting plate.

In some embodiments, the power take-up assembly includes a guide rail, a slider and a current collector, the guide rail being movably provided on the frame, the slider being movably provided on the guide rail, and the current collector being provided on the slider.

In some embodiments, the power take-up assembly includes a rotational power source, a first rod and a second rod, the rotational power source being provided on the guide rail, a first end of the first rod being connected to an output shaft of the rotational power source, a second end of the first rod being connected to a first end of the second rod, and a second end of the second rod being connected to the slider.

In some embodiments, two the climbing assemblies are provided on two opposite sides of the frame respectively.

In another aspect of some embodiments of the present disclosure, a logistics system is provided, which includes a first rail assembly and the above-mentioned logistics vehicle, the first rail assembly being arranged vertically, and the logistics vehicle being configured to be movable along the first rail assembly.

In some embodiments, the first rail assembly includes:
  a first rail arranged vertically and having a U-shaped cross section;
  a rack provided in a U-shaped cavity of the first rail and arranged in an extension direction of the first rail to cooperate with the climbing wheel; and
  a slide wire provided in the U-shaped cavity of the first rail and arranged in the extension direction of the first rail to cooperate with the power take-up assembly to supply power.

In some embodiments, the climbing assembly includes a support wheel, and the first rail assembly includes a support guide, the support guide being provided in the U-shaped cavity of the first rail and being arranged in the extension direction of the first rail to cooperate with the support wheel to support, guide and limit the support wheel.

In some embodiments, the logistics system further includes at least two second rail assemblies, the at least two second rail assemblies being arranged laterally, two adjacent ones of the at least two second rail assemblies being arranged up and down, the logistics vehicle being configured to be movable along the at least two second rail assemblies and movable along the first rail assembly to switch to second rail assemblies located at different heights.

Based on the above technical solutions, the present disclosure has at least the following beneficial effects:

In some embodiments, when the logistics vehicle needs to move along the first rail assembly, the climbing wheel extends with respect to the frame to cooperate with the first rail assembly arranged vertically, and when the logistics vehicle finishes climbing, the climbing wheel retracts with respect to the frame and is located in the frame; furthermore, the power take-up assembly extends with respect to the frame to take up power when the climbing wheel extends with respect to the frame and cooperates with the first rail assembly, and the power take-up assembly retracts when the climbing wheel retracts with respect to the frame; the power take-up assembly is used to provide motive power for the climbing of the logistics vehicle, and neither the climbing wheel nor the power take-up assembly collides with a goods shelf, a machine body, a rail assembly or other foreign objects, which reduces the safety risk.

BRIEF DESCRIPTION OF THE DRAWINGS

Drawings described here are used to provide further understanding of the present disclosure and form a part of the present application. Illustrative embodiments of the present disclosure and description thereof are used for explaining the present disclosure, but do not improperly limit the present disclosure. In the drawings.

DETAILED DESCRIPTION OF THE EMBODIMENTS

The technical solutions in the embodiments will be described clearly and completely below in conjunction with the accompanying drawings in the embodiments of the present disclosure. Obviously, the described embodiments are only a part of the embodiments of the present disclosure, and not all the embodiments. Based on the embodiments in the present disclosure, all other embodiments obtained by those of ordinary skill in the art without creative work should fall into the protection scope of the present disclosure.

In description of the present disclosure, it needs to be appreciated that orientation or position relations denoted by the terms "center", "longitudinal", "transverse", "front", "rear", "left", "right", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

Some embodiments of the present disclosure propose a logistics vehicle and a logistics system suitable for climbing operation.

Figure 1:
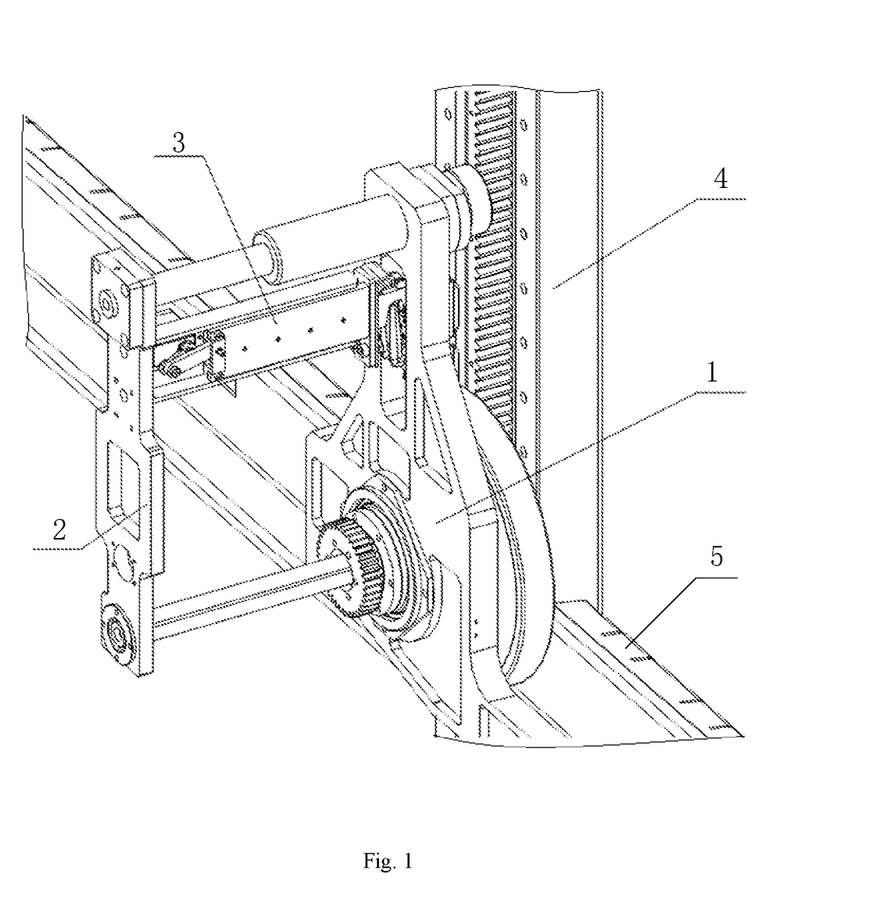
FIG. 1 is a partial structure diagram of a logistics vehicle provided according to some embodiments of the present disclosure.

As shown in FIG. 1, in some embodiments, the logistics vehicle includes a frame 1, a climbing assembly 2, and a power take-up assembly 3.

The frame 1 is a main body of the logistics vehicle.

Figure 2:
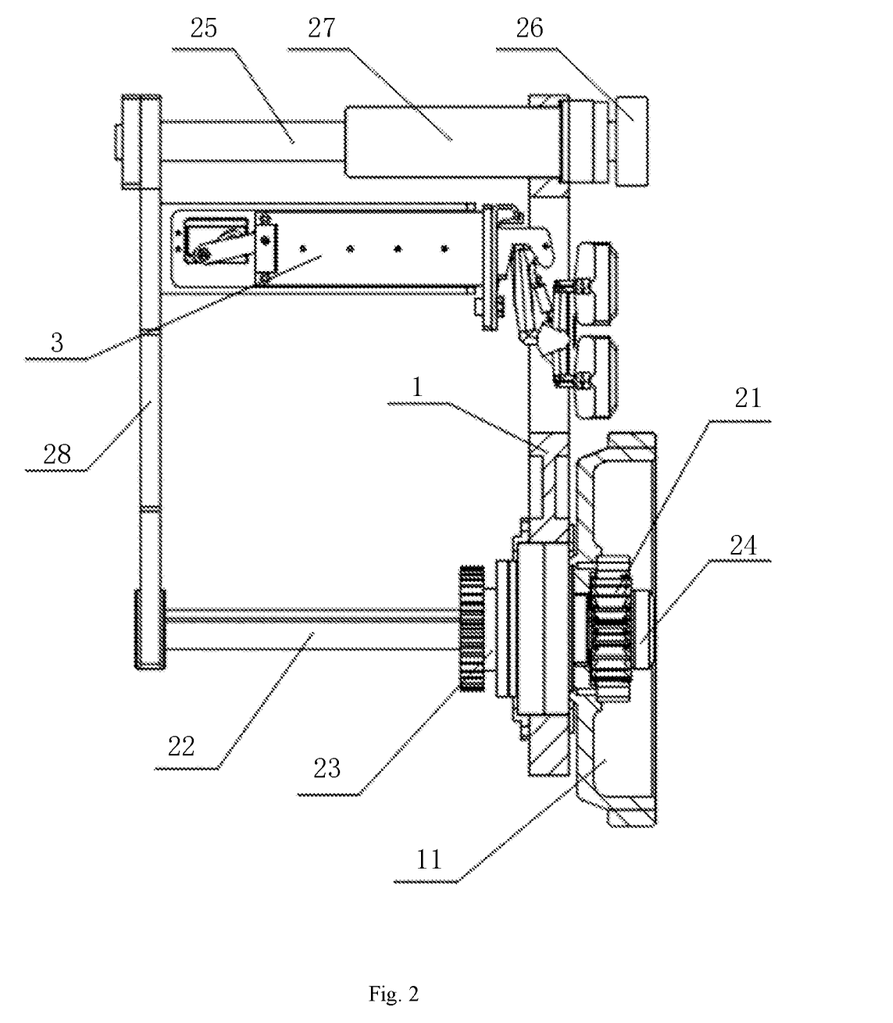
FIG. 2 is a schematic diagram of a logistics vehicle provided according to some embodiments of the present disclosure with a climbing wheel and a power take-up assembly retracted with respect to a frame.
Figure 3:
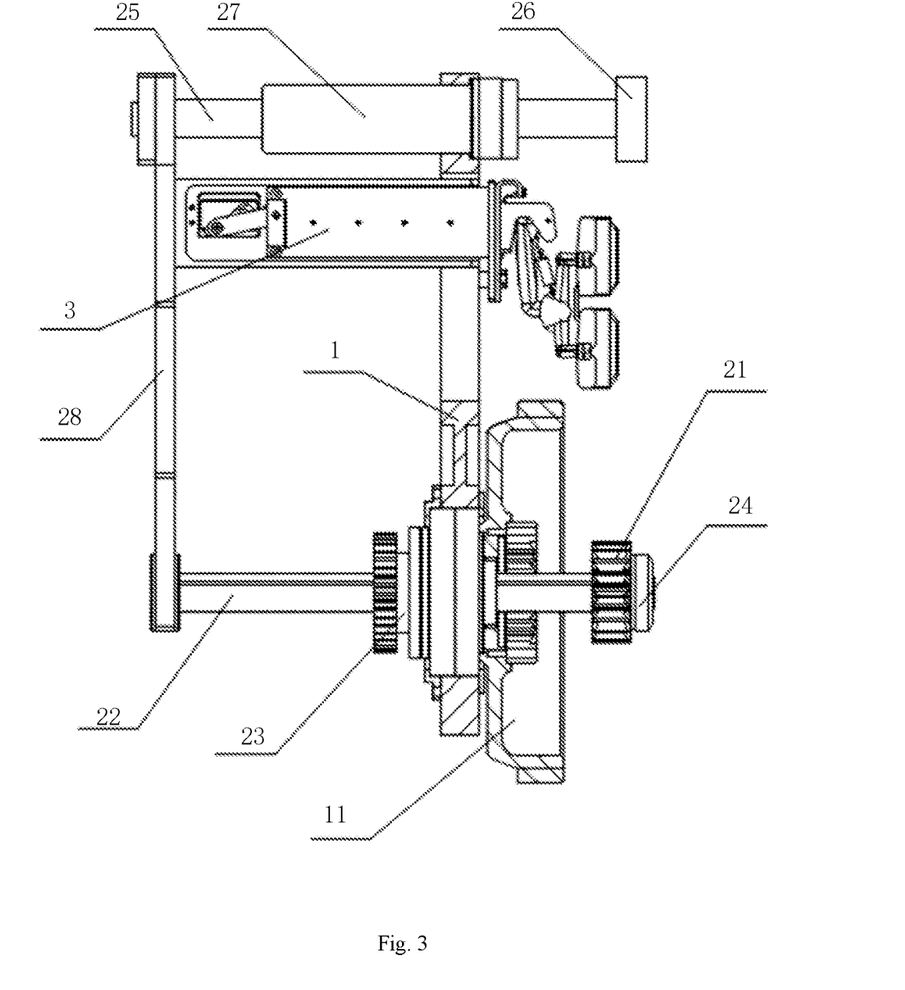
FIG. 3 is a schematic diagram of a logistics vehicle provided according to some embodiments of the present disclosure with the climbing wheel and the power take-up assembly extended with respect to the frame.

As shown in FIGS. 2 and 3, the climbing assembly 2 includes a climbing wheel 21. The climbing wheel 21 is movably provided on the frame 1. The climbing wheel 21 is configured to be extendable with respect to the frame 1, to cooperate with a first rail assembly 4 arranged vertically, so that the logistics vehicle moves along the first rail assembly 4, and the climbing wheel 21 is configured to be retractable with respect to the frame 1 and located in the frame 1 to avoid collision with foreign objects and reduce potential safety hazards.

The first rail assembly 4 is arranged vertically, and the climbing wheel 21 moves laterally with respect to the frame 1, i.e., the climbing wheel 21 extends laterally with respect to the frame 1 and cooperates with the first rail assembly 4 arranged vertically, so that the logistics vehicle moves up and down along the first rail assembly 4.

The power take-up assembly 3 is movably provided on the frame 1. The power take-up assembly 3 is configured to extend with respect to the frame 1 to take up power when the climbing wheel 21 extends with respect to the frame 1 and cooperates with the first rail assembly 4, to provide a motive force for the up-down movement of the first rail assembly 4, and the power take-up assembly 3 is configured to retract when the climbing wheel 21 retracts with respect to the frame 1, to avoid collision with foreign objects and reduce potential safety hazards.

In some embodiments, the logistics vehicle further includes a wheel 11. The wheel 11 is provided on the frame 1. The wheel 11 is configured to move and travel on a second rail assembly 5 arranged laterally or horizontally.

The logistics vehicle provided in some embodiments can both move on the second rail assembly 5 arranged laterally or horizontally, and move up and down on the first rail assembly 4 arranged vertically, so the self-weight of a vehicle body is controlled strictly, and the electric energy storage capacity of the body is limited. When the logistics vehicle performs horizontal movement, the energy consumption is small, and the energy stored in an energy storage element of the body is sufficient for use. However, during vertical climbing, the energy consumption is large, and the energy storage element of the body cannot provide sufficient energy. Therefore, when the climbing wheel 21 extends with respect to the frame 1 and cooperates with the first rail assembly 4, and the logistics vehicle moves along the first rail assembly 4, the power take-up assembly 3 extends with respect to the frame 1 to take up power for meeting the vertical climbing condition of the logistics vehicle, so that the logistics vehicle can both move on the second rail assembly 5 arranged laterally or horizontally, and move on the first rail assembly 4 arranged vertically.

In some embodiments, when the logistics vehicle needs to move along the first rail assembly 4, the climbing wheel 21 extends with respect to the frame 1 to cooperate with the first rail assembly 4 arranged vertically, and when the logistics vehicle finishes climbing and needs to move on the second rail assembly 5 arranged laterally or horizontally, the climbing wheel 21 retracts with respect to the frame 1 and is located in the frame 1; furthermore, the power take-up assembly 3 extends with respect to the frame 1 to take up power when the climbing wheel 21 extends with respect to the frame 1 and cooperates with the first rail assembly 4, and the power take-up assembly retracts when the climbing wheel 21 retracts with respect to the frame 1; therefore, neither the climbing wheel 21 nor the power take-up assembly 3 collides with a goods shelf, a machine body, a rail assembly or other foreign objects, which reduces the risk.

In some embodiments, the climbing assembly 2 includes a first axle 22. The first axle 22 is movably provided on the frame 1, and the climbing wheel 21 is provided on the first axle 22. The climbing wheel 21 moves with the movement of the first axle 22. The climbing wheel 21 is configured to cooperate with a rack 42 of the first rail assembly 4 to achieve the movement of the logistics vehicle along a first rail 41 of the first rail assembly 4.

In some embodiments, the climbing assembly 2 includes a first guide sleeve 23. The first guide sleeve 23 is fixedly provided on the frame 1, and the first axle 22 is movably passed through the first guide sleeve 23. The first axle 22 is coaxial with the first guide sleeve 23, and the first axle 22 moves along the first guide sleeve 23, and the first guide sleeve 23 guides the movement of the first axle 22.

In some embodiments, the climbing assembly 2 includes a support wheel 24. The support wheel 24 is provided on the first axle 22, and the support wheel 24 is closer to the outer side of the frame 1 with respect to the climbing wheel 21, and a diameter of the support wheel 24 is smaller than that of the climbing wheel 21. The support wheel 24 is configured to cooperate with a support guide 44 of the first rail assembly 4 to support, limit and guide the movement of the logistics vehicle along the first rail 41 of the first rail assembly 4.

In some embodiments, the climbing assembly 2 includes a second axle 25 and a guide wheel 26. The second axle 25 is movably provided on the frame 1, and the guide wheel 26 is provided on the second axle 25. The guide wheel 26 moves with the movement of the second axle 25. The support wheel 26 is configured to cooperate with an inner wall of a U-shaped cavity of the first rail 41 of the first rail assembly 4 to guide the movement of the logistics vehicle along the first rail 41 of the first rail assembly 4.

In some embodiments, the climbing assembly 2 includes a second guide sleeve 27. The second guide sleeve 27 is fixedly provided on the frame 1, and the second axle 25 is movably passed through the second guide sleeve 27. The second axle 25 is coaxial with the second guide sleeve 27, and the second axle 25 moves along the second guide sleeve 27, and the second guide sleeve 27 guides the movement of the second axle 25.

In some embodiments, the first axle 22 is parallel to the second axle 25, and the second axle 25 is located above the first axle 22. The power take-up assembly 3 is provided between the first axle 22 and the second axle 25.

In some embodiments, the climbing assembly 2 includes a connecting plate 28. The connecting plate 28 connects the first axle 22 and the second axle 25. The logistics vehicle includes a power unit, which is in driving connection with the connecting plate 28 to drive the connecting plate 28 to move relative to the frame 1. The connecting plate 28 moves relative to the frame 1, and thus the first axle 22 and the second axle 25 move relative to the frame 1.

The connecting plate 28 is connected to a first end of the first axle 22 and a first end of the second axle 25 respectively. The climbing wheel 21 and the support wheel 24 are mounted to a second end of the first axle 22, and the guide wheel 26 is mounted to a second end of the second axle 25.

In some embodiments, the power take-up assembly 3 is provided on the connecting plate 28. The power take-up assembly 3 moves with the movement of the connecting plate 28. The power take-up assembly 3 is mounted to a first side of the connecting plate 28, and the first axle 22 and the second axle 25 are mounted to the first side of the connecting plate 28, and the power take-up assembly 3 is located between the first axle 22 and the second axle 25.

Under the drive of the power unit, the first axle 22 and the second axle 25 can extend synchronously and respectively along the first guide sleeve 23 and the second guide sleeve 27 toward the outer side of the frame 1, and at the same time, the power take-up assembly 3 also extends simultaneously toward the outer side of the frame 1, as shown in FIG. 3.

Under the drive of the power unit, the first axle 22 and the second axle 25 can retract synchronously and respectively along the first guide sleeve 23 and the second guide sleeve 27 toward the inner side of the frame 1, and at the same time, the power take-up assembly 3 also retracts simultaneously toward the inner side of the frame 1, as shown in FIG. 2.

The power take-up assembly 3 is mounted to the climbing assembly 2 and can extend and retract together with the guide wheel 26, the climbing wheel 21, the support wheel 24 and other components, and is not fixed and installed separately, thus achieving a simple structure and good synchronization.

Figure 4:
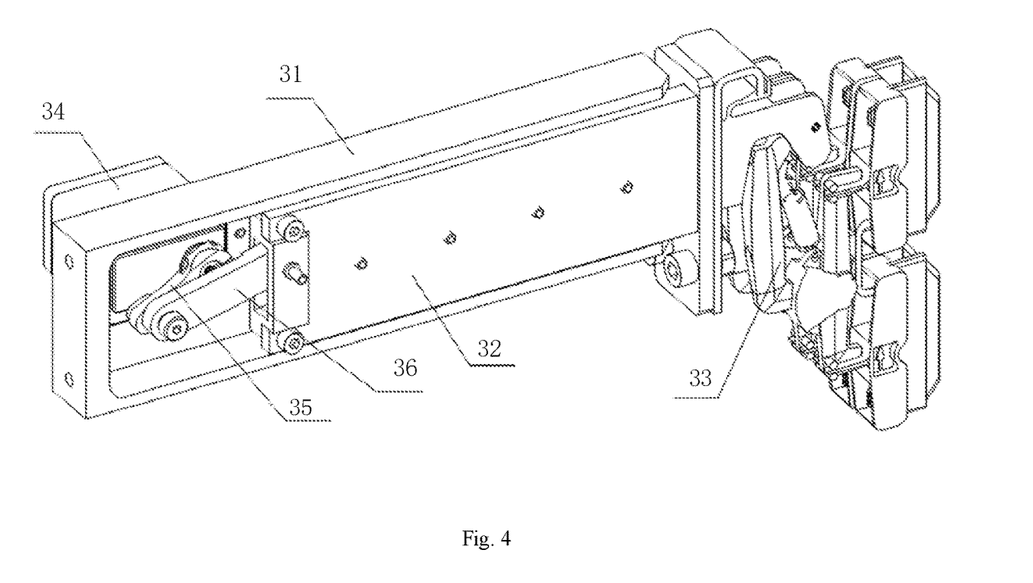
FIG. 4 is a schematic diagram of a retracted state of the power take-up assembly provided according to some embodiments of the present disclosure.
Figure 5:
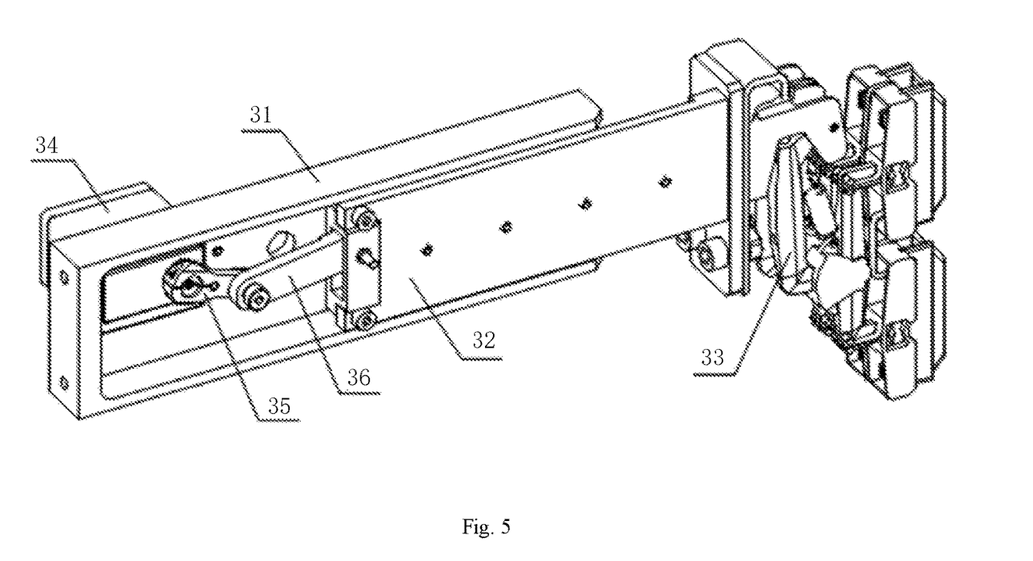
FIG. 5 is a schematic diagram of an extended state of the power take-up assembly provided according to some embodiments of the present disclosure.

In some embodiments, as shown in FIGS. 4 and 5, the power take-up assembly 3 includes a guide rail 31, a slider 32 and a current collector 33. The guide rail 31 is movably provided on the frame 1, the slider 32 is movably provided on the guide rail 31, and the current collector 33 is provided on the slider 32. The current collector 33 is configured to engage with a slide wire 43 of the first rail assembly 1 to take up power. When the logistics vehicle climbs, a brush of the current collector 33 can be in contact with a conductor of the slide wire 43 all the time to ensure continuous power supply.

An extension direction of the guide rail 31 is same as extension directions of the first axle 22 and the second axle 25. A sliding direction of the slider 32 is same as the extension directions of the first axle 22 and the second axle 25.

When the logistics vehicle is moving vertically along the first rail assembly 4, the current collector 33 extends with respect to the frame 1 and engages with the slide wire 43 of the first rail assembly 1 to take up power, and when the logistics vehicle is moving laterally or horizontally along the second rail assembly 5, the current collector 33 retracts with respect to the interior of the frame 1 to avoid collision with a goods shelf, a machine body, a rail assembly or other fixed components.

In some embodiments, the power take-up assembly 3 includes a rotational power source 34, a first rod 35 and a second rod 36. The rotational power source 34 is provided on the guide rail 31. A first end of the first rod 35 is connected to an output shaft of the rotational power source 34, and a second end of the first rod 35 is connected to a first end of the second rod 36. A second end of the second rod 36 is connected to the slider 32.

The rotational power source 34 includes a motor or a rotating cylinder, or the like.

The guide rail 31, the first rod 35, the second rod 36 and the slider 32 form a set of crank-connecting rod-slider mechanism. The current collector 33 is mounted at one end of the slider 32, and driven by the rotational power source 34, the slider 32 causes the current collector 33 to perform reciprocating motion. The stroke of the reciprocating motion of the current collector 33 can be controlled by controlling the rotation angle of the rotational power source 34.

A state when the current collector 33 extends is shown in FIG. 5, and a state when the current collector 33 retracts is shown in FIG. 4.

The power take-up assembly 3 itself has an extending and retracting function and a controllable stroke, so that the extending and retracting stroke of the current collector 33 is increased and its position is controllable, to improve the contact reliability between the current collector 33 and the slide wire 43, and the current collector 33 can completely retract into the interior of the frame 1, which eliminates the risk of collision with a goods shelf, a machine body, a rail assembly or other fixed components. Moreover, when the logistics truck switches between the horizontal movement and the vertical movement, it can smoothly achieve the engagement or disengagement of the current collector 33 and the slide wire 43, and ensure that the extension and retraction positions of the current collector 33 are controllable to improve the safety of the engagement and disengagement.

In some embodiments, two the climbing assemblies 2 are provided on two opposite sides of the frame 1. Each logistics vehicle is provided with two or more sets of climbing assemblies 2, and two the climbing assemblies 2 are symmetrically distributed on the left side and the right side of the frame 1.

Some embodiments provide a logistics system, which includes a first rail assembly 4 and the logistics vehicle in the above embodiments. The first rail assembly 4 is arranged vertically, and the logistics vehicle is configured to be movable along the first rail assembly 4.

Figure 6:
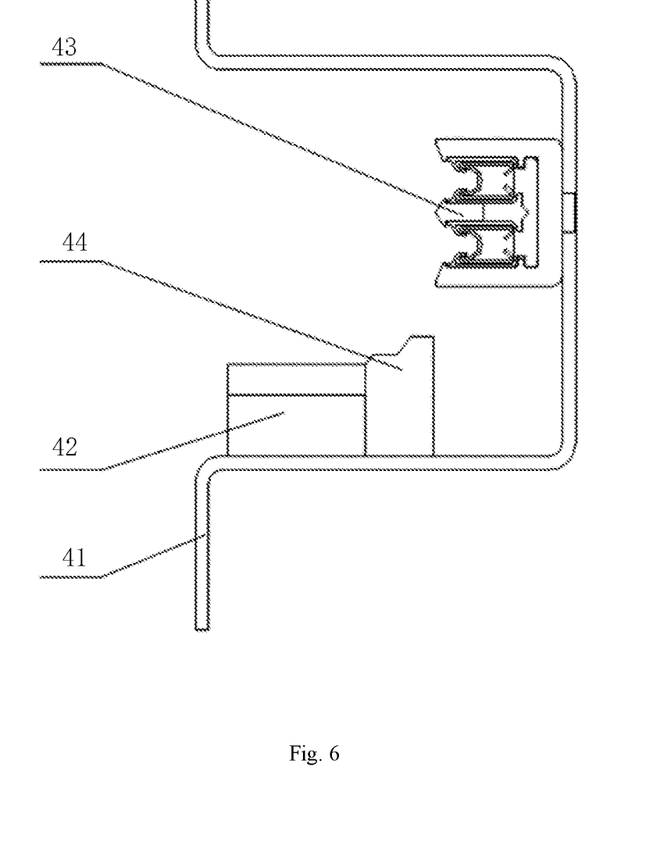
FIG. 6 is a cross-sectional diagram of a first rail assembly provided according to some embodiments of the present disclosure.

In some embodiments, as shown in FIG. 6, the first rail assembly 4 includes a first rail 41, a rack 42, and a slide wire 43.

The first rail 41 is arranged vertically and has a U-shaped cross section.

The rack 42 is provided in the U-shaped cavity of the first rail 41 and arranged in an extension direction of the first rail 41 to cooperate with the climbing wheel 21. The climbing wheel 21 is a gear and engages with the rack 42 to achieve ascending and descending movement of the logistics vehicle.

The slide wire 43 is provided in the U-shaped cavity of the first rail 41 and arranged in the extension direction of the first rail 31 to cooperate with the current collector 33 of the power take-up assembly 3 to supply power.

When the power take-up assembly 3 draws power, a brush of the current collector 33 is in contact with a conductor of the slide wire 43 all the time to ensure continuous power supply.

In some embodiments, the first rail assembly 4 includes a support guide 44. The support guide 44 is provided in the U-shaped cavity of the first rail 41 and is arranged in the extension direction of the first rail 41 to cooperate with the support wheel 24 to support, guide and limit the support wheel 24.

In some embodiments, the logistics system includes at least two second rail assemblies 5. The at least two second rail assemblies 5 are arranged laterally or horizontally, and two adjacent second rail assemblies 5 are arranged up and down, and the logistics vehicle is configured to be movable along the at least two second rail assemblies 5 and movable along the first rail assembly 4 to switch to second rail assemblies 5 located at different heights.

In some embodiments, the second rail assemblies 5 are arranged horizontally, and the first rail assembly 4 is arranged vertically with respect to a horizontal plane. The climbing assembly 2 can perform extension and retraction movement along a horizontal direction of the frame 1; the power take-up assembly 3 is mounted to the climbing assembly 2; and the number of the first rail assembly 4 is same as the number of the climbing assembly 2.

When the logistics vehicle switches from horizontal movement to vertical climbing movement, the current collector 33 needs to be placed in a suitable position and brought into good contact with the slide wire 43. When the logistics vehicle moves horizontally, the current collector 33 is retracted and placed inside the frame 1 to prevent it from scratching foreign objects during movement.

Figure 7:
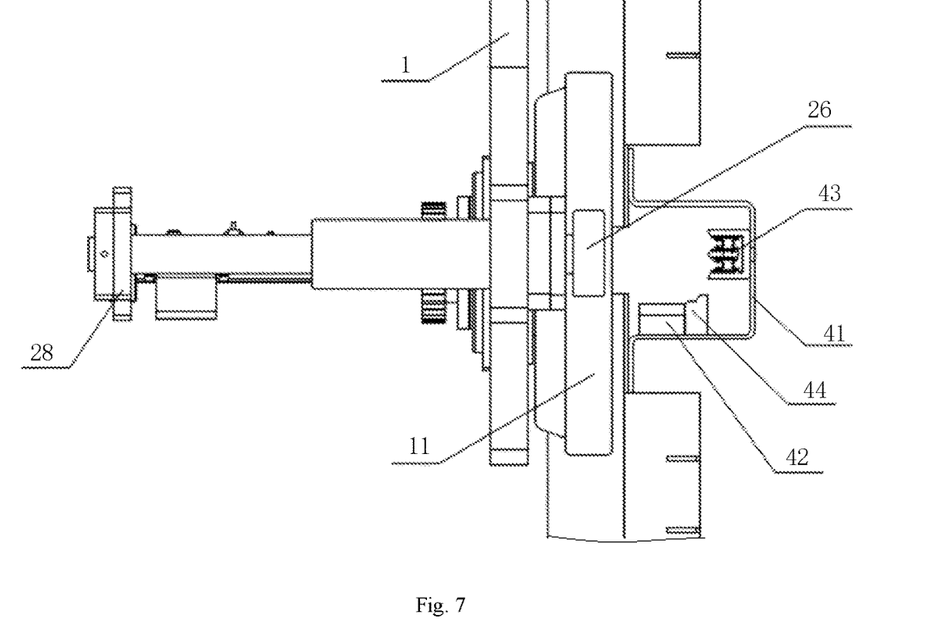
FIG. 7 is a cross-sectional diagram of the logistics vehicle provided according to some embodiments of the present disclosure that is not moving in cooperation with the first rail assembly.

When the logistics vehicle moves horizontally along the second rail assembly 5, both the climbing assembly 2 and the power take-up assembly 3 are in a contracted state, and the current collector 33 is retracted inside the frame 1. Relative positions of the logistics vehicle and the first rail assembly 4 are shown in FIG. 7.

Figure 8:
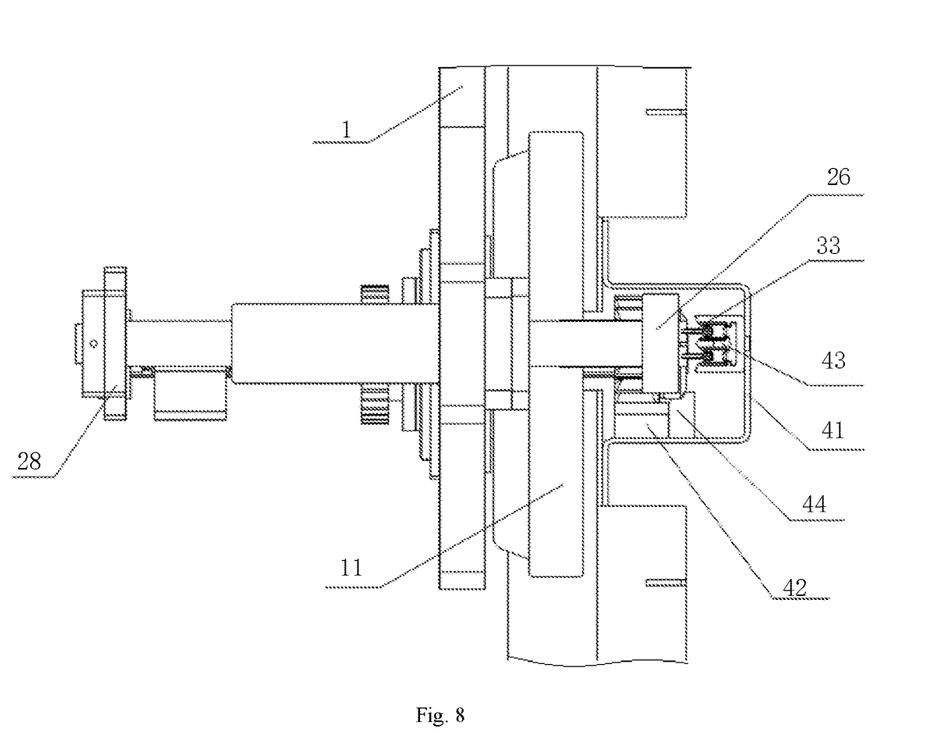
FIG. 8 is a cross-sectional diagram of the logistics vehicle provided according to some embodiments of the present disclosure that is moving in cooperation with the first rail assembly.

As shown in FIG. 8, when the logistics vehicle needs to climb, the climbing assembly 2 extends to the outside of the frame 1, and the guide wheel 26, the climbing wheel 21 and the support wheel 24 extend into the U-shaped cavity of the first rail 41, and the climbing wheel 21 engages with the rack 42. Meanwhile, the power take-up assembly 3 also extends to the outside of the frame 1, and the current collector 33 comes into contact with the slide wire 43 to ensure power supply to the logistics vehicle.

After the climbing is finished, both the climbing assembly 2 and the power take-up assembly 3 retract.

Based on the embodiments of the present disclosure described above, technical features of one of the embodiments may beneficially be combined with one or more other embodiments, unless explicitly denied.

In the description of the present disclosure, it needs to be appreciated that the use of the terms "first", "second", "third" and the like to define parts and components is only for the convenience of distinguishing the above-mentioned parts and components. Unless otherwise stated, the above terms have no special meanings, and therefore cannot be construed as limitations on the protection scope of the present disclosure.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. A logistics vehicle, comprising:
a frame;
a climbing assembly, comprising a climbing wheel, a first axle and a connecting plate, the connecting plate movably provided on the frame, the connecting plate being connected with the first axle, and the climbing wheel being provided on the first axle, the climbing wheel being configured to move with the connecting plate, and be extendable with respect to the frame to cooperate with a first rail assembly arranged vertically, so that the logistics vehicle moves along the first rail assembly, and the climbing wheel being configured to be retractable with respect to the frame; and
a power take-up assembly being movably provided on the frame and connected with the connecting plate, the power take-up assembly being configured to move with the connecting plate, and be extendable with respect to the frame to take up power when the climbing wheel extends with respect to the frame and cooperates with the first rail assembly; and the power take-up assembly being further configured to retract when the climbing wheel retracts with respect to the frame;
the climbing assembly is configured to extend outward from the frame to engage with the first rail assembly arranged vertically when the logistics vehicle requires climbing, while the power take-up assembly simultaneously extends outward from the frame to draw electrical power.

2. The logistics vehicle according to claim 1, wherein the climbing assembly further comprises a first guide sleeve, the first guide sleeve being fixedly arranged on the frame, and the first axle being movably passed through the first guide sleeve.

3. The logistics vehicle according to claim 1, wherein the climbing assembly further comprises a support wheel, the support wheel being provided on the first axle, the support wheel being closer to an outer side of the frame with respect to the climbing wheel, the diameter of the support wheel being smaller than that of the climbing wheel.

4. The logistics vehicle according to claim 1, wherein the climbing assembly further comprises a second axle and a guide wheel, the second axle being movably provided on the frame, and the guide wheel being provided on the second axle.

5. The logistics vehicle according to claim 3, wherein the climbing assembly further comprises a second guide sleeve, the second guide sleeve being fixedly provided on the frame, and the second axle being movably passed through the second guide sleeve.

6. The logistics vehicle according to claim 3, the connecting plate connecting the second axle; and the logistics vehicle comprises a power unit, which is in driving connection with the connecting plate to drive the connecting plate to move relative to the frame.

7. The logistics vehicle according to claim 1, wherein the power take-up assembly comprises a guide rail, a slider and a current collector, the guide rail being movably provided on the frame, the slider being movably provided on the guide rail, and the current collector being provided on the slider.

8. The logistics vehicle according to claim 7, wherein the power take-up assembly comprises a rotational power source, a first rod and a second rod, the rotational power source being provided on the guide rail, a first end of the first rod being connected to an output shaft of the rotational power source, a second end of the first rod being connected to a first end of the second rod, and a second end of the second rod being connected to the slider.

9. The logistics vehicle according to claim 1, wherein the climbing assembly comprises two climbing assemblies, wherein the frame comprises opposite sides, and wherein each of the two climbing assemblies is on a respective one of the opposite sides of the frame.

10. A logistics system, comprising a first rail assembly and the logistics vehicle according to claim 1, the first rail assembly being arranged vertically, the logistics vehicle being configured to be movable along the first rail assembly.

11. The logistics system according to claim 10, wherein the first rail assembly comprises:
a first rail arranged vertically and having a U-shaped cross section;
a rack provided in a U-shaped cavity of the first rail and arranged in an extension direction of the first rail to cooperate with the climbing wheel; and
a slide wire provided in the U-shaped cavity of the first rail and arranged in the extension direction of the first rail to cooperate with the power take-up assembly to supply power.

12. The logistics system according to claim 10, wherein the climbing assembly comprises a support wheel, and the first rail assembly comprises a support guide, the support guide being provided in the U-shaped cavity of the first rail and being arranged in the extension direction of the first rail to cooperate with the support wheel to support, guide and limit the support wheel.

13. The logistics system according to claim 10, further comprising at least two second rail assemblies, the at least two second rail assemblies being arranged laterally, two adjacent ones of the at least two second rail assemblies being arranged at vertical intervals, the logistics vehicle being configured to be movable along the at least two second rail assemblies and movable along the first rail assembly to switch to second rail assemblies located at different heights.

* * * * *